(12) United States Patent
Tanaka et al.

(10) Patent No.: US 7,542,644 B2
(45) Date of Patent: Jun. 2, 2009

(54) COATED OPTICAL FIBER AND COATED OPTICAL FIBER WITH CONNECTOR

(75) Inventors: Kazunori Tanaka, Kanagawa (JP); Kaoru Okuno, Kanagawa (JP); Tomoyuki Hattori, Kanagawa (JP); Kiyoaki Moriuchi, Osaka (JP); Hiroshi Hayami, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 306 days.

(21) Appl. No.: 10/523,994

(22) PCT Filed: Feb. 19, 2004

(86) PCT No.: PCT/JP2004/001888

§ 371 (c)(1),
(2), (4) Date: Feb. 9, 2005

(87) PCT Pub. No.: WO2004/074898

PCT Pub. Date: Sep. 2, 2004

(65) Prior Publication Data

US 2006/0088263 A1 Apr. 27, 2006

(30) Foreign Application Priority Data

Feb. 20, 2003 (JP) ............................ 2003-043338
Feb. 21, 2003 (JP) ............................ 2003-044074

(51) Int. Cl.
*G02B 6/44* (2006.01)
(52) U.S. Cl. .................................................... 385/114
(58) Field of Classification Search .................. 385/114
See application file for complete search history.

(56) References Cited

U.S. PATENT DOCUMENTS 5,814,406 A * 9/1998 Newmoyer ................. 428/379

(Continued)

FOREIGN PATENT DOCUMENTS

JP 2-146005 A 6/1990

(Continued)

OTHER PUBLICATIONS

European Search Report issued in Patent Application No. 04 712 701.4-1234 dated on Nov. 6, 2008.

(Continued)

*Primary Examiner*—Uyen Chau N Le
*Assistant Examiner*—Hoang Tran
(74) *Attorney, Agent, or Firm*—McDermott Will & Emery LLP

(57) ABSTRACT

An object of the present invention is to provide a buffered optical fiber, which excels in environmental characteristics and mechanical characteristics and has high flame retardancy and excels in optical transmission characteristics, and to provide a buffered optical fiber, which is terminated with a connector and uses this buffered optical fiber. The buffered optical fiber of the invention is provided with a second coating layer on an outer peripheral surface of an optical fiber produced by providing a first coating layer on an outer peripheral surface of a glass fiber. A second resin composition constituting the second coating layer comprises 100 to 250 weight parts of metal hydroxide and 10 to 100 weight parts of a nitrogen-based flame retardant material per 100 weight parts of the base polymer. Further, the second resin composition does not contain halogenated materials.

11 Claims, 8 Drawing Sheets

U.S. PATENT DOCUMENTS

| | | |
|---|---|---|
| 2003/0128938 A1* | 7/2003 | Caveney .................. 385/81 |
| 2003/0158309 A1* | 8/2003 | Ono et al. .................. 524/261 |
| 2004/0109650 A1* | 6/2004 | Kim et al. .................. 385/100 |

FOREIGN PATENT DOCUMENTS

| | | |
|---|---|---|
| JP | 2-212339 A | 8/1990 |
| JP | 2000-241676 A | 9/2000 |
| JP | 2000-351920 | 12/2000 |
| JP | 2001-83380 A | 3/2001 |
| JP | 2001-200164 | 7/2001 |
| JP | 2001-278641 A | 10/2001 |
| JP | 2001-316537 A | 11/2001 |
| JP | 2002-088253 | 3/2002 |
| JP | 2002-214492 | 7/2002 |
| WO | WO 98/23674 | 6/1998 |

OTHER PUBLICATIONS

Japanese Office Action issued in corresponding Japanese Patent Application No. 2004-044074, dated Oct. 12, 2006.

Japanese Office Action issued in corresponding Japanese Patent Application No. 2003-043338, dated Oct. 12, 2006.

* cited by examiner

COATED OPTICAL FIBER AND COATED OPTICAL FIBER WITH CONNECTOR

TECHNICAL FIELD

The present invention relates to a buffered optical fiber and to a buffered optical fiber terminated with a connector.

BACKGROUND ART

A buffered optical fiber is coated with a first coating layer of a thermal-curable silicone resin coating film on the outer periphery of a glass fiber, which contains silica glass as its main component and has an outer diameter of 125 µm, so that the outer diameter of the first coating layer becomes 400 µm, and further coated with a second coating layer of a polyamide thermoplastic polymer on the outer periphery of the first coating layer. The buffered optical fiber has been used for an optical cord or the like (Prior Art 1: see Patent Document 1). Incidentally, the optical cord is usually configured so that a tensile strength wire is disposed outside the optical fiber and a sheath layer made of vinyl chloride or the like is provided outside the optical fiber and the tensile strength wire. The optical cord is used for the wiring system in the optical communication device, or the like.

Meanwhile, in recent years, according to a demand for reducing the pollution in the environmental system, there is a demand for no fear of producing harmful gas, such as hydrochloric gas, when cords and cables are burnt.

An unshielded and twisted pair cable produced by steps of twisting a pair of insulated cores which are obtained by insulating conductors with insulators, to thereby form twisted pair wires, bundling the twisted pair wires, and applying an sheath thereon is known as a cable which produces no harmful gas and also has flame retardancy. In this cable, some kinds of flame retardant materials are added to at least outer surfaces of the insulators and the sheaths. A phosphorus compound, a hydrated metallic compound, and a metal oxide compound are exemplified as flame retardant materials (Prior Art2: see Patent Document 2).

Patent Document 1: JP-A-62-99708.
Patent Document 2: JP-A-8-138454.

However, according to prior art, a buffered optical fiber that does not pollute the environment system, and has flame retardancy, is not obtained.

DISCLOSURE OF INVENTION

The invention solves the aforementioned problems. An object of the invention is to provide a buffered optical fiber which does not pollute the environment system, and having flame retardancy and excellent optical transmission characteristics.

A buffered optical fiber according to the invention is provided with a second coating layer on an outer peripheral surface of an optical fiber produced by providing a first coating layer on an outer peripheral surface of a glass fiber. A second resin composition of the second coating layer comprises a base polymer, and 100 to 250 weight parts of metal hydroxide and 10 to 100 weight parts of a nitrogen-based flame retardant material per 100 weight parts of the base polymer. Additionally, the second resin composition does not contain halogenated materials.

Preferably, the base polymer is constituted by a noncrystalline resin.

More preferably, the second resin composition comprises, as the base polymer, one of components selected from the group consisting of: a polystyrene-based polymer, a polystyrene-based elastomer, a mixture of polystyrene-based polymer and polyphenylene ether polymer, and a mixture of polystyrene-based elastomer and polyphenylene ether polymer.

More preferably, a part of the polystyrene-based polymer or the polystyrene-based elastomer is subjected to acid modification.

More preferably, the second coating layer is formed of two or more coating sublayers.

More preferably, the buffered optical fiber is constituted so that an amount of transmission loss variation (dB/km) as defined below is equal to or less than 0.2 dB/km:

THE AMOUNT OF TRANSMISSION LOSS VARIATION: the difference in quantity between the maximum loss variation and the minimum loss variation in a transmission loss amount (in dB/km at a wavelength of 1.55 µm and including a transmission loss amount generated just after the test is started) generated during a heat cycle exposure test performed by repeating a heat cycle consisting of 0.5 hours, in which the temperature is held at $(-40)°$ C., and 0.5 hours, in which the temperature is held at 85° C.

More preferably, the linear expansion coefficient of the second resin composition is equal to or less than $4.0 \times 10^{-4}$ (1/K).

More preferably, residual thermal distortion at cabling, as defined below, is equal to or less than 150 µm.

THE RESIDUAL THERMAL DISTORTION AT CABLING: the distance between an edge of the glass fiber and that of the second coating layer in the buffered optical fiber that is heat-treated at 120° C. for 168 hours.

More preferably, the buffered optical fiber has the first coating layer of an ultraviolet curable resin layer, and the buffered optical fiber is configured so that when a cut is made in the direction from the second coating layer to the glass fiber so as not to allow an apex of the cut to reach the glass fiber, and the ultraviolet curable resin layer and the second coating layer are separated from the glass fiber by drawing them out of the glass fiber, the "ratio of the length of the ultraviolet curable resin layer in a separated and removed coat piece to that of the separated second coating layer" is 15% to 85%.

More preferably, an inner layer and an outer layer are serially provided as the sublayers of the second coating layer on an outer peripheral surface of the optical fiber in a direction in which the layers are away from the optical fiber. Further, the inner layer is derived by adding 100 to 250 weight parts of metal hydroxide and less than 100 weight parts of a nitrogen-based flame retardant material to 100 weight parts of polystyrene-based thermoplastic polymer, polyolefin-based thermoplastic polymer, or polyphenylene ether polymer, or a mixed polymer of these materials.

More preferably, an inner layer and an outer layer are serially provided as the sublayers of the second coating layer on an outer peripheral surface of the optical fiber in a direction in which the layers are away from the optical fiber. Further, the outer layer is derived by adding 100 to 250 weight parts of metal hydroxide and less than 100 weight parts of a nitrogen-based flame retardant material to 100 weight parts of polystyrene-based thermoplastic polymer, polyolefin-based thermoplastic polymer, or polyphenylene ether polymer, or a mixed polymer of these materials.

More preferably, the buffered optical fiber is constituted so that a force of drawing out the ultraviolet curable resin layer and the second coating layer from the glass fiber is equal to or less than 2.5 kgf.

Further, a buffered optical fiber terminated with a connector according to the invention is obtained by connecting a buffered optical fiber according to the invention, which is configured by exposing a part having a predetermined length from an end of the glass fiber thereby to have a glass fiber exposure portion and a coating end surface and a connector incorporating a ferrule that has a hollow space enabled to accommodate the glass fiber exposure portion. In the buffered optical fiber terminated with the connector, the coating end surface abuts against an abutting end surface of the ferrule so as to accommodate the glass fiber exposure portion in a state, in which no distortion force is applied to the glass fiber exposure portion in the hollow space.

Figure 1:
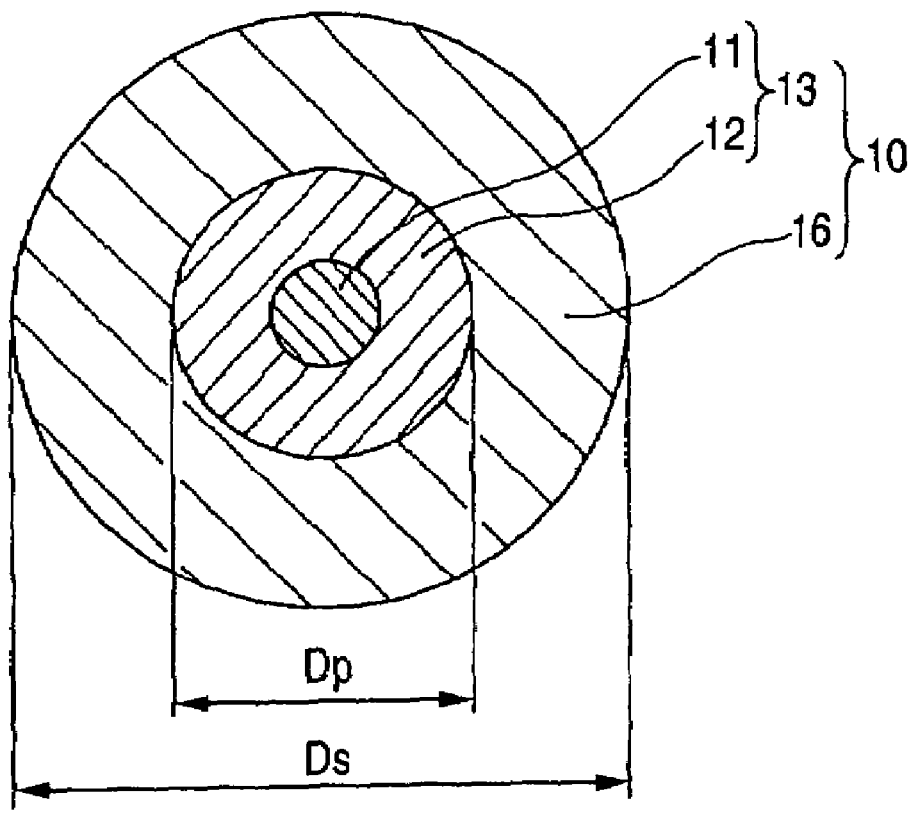
FIG. 1 is a schematic cross-sectional view of a buffered optical fiber according to an embodiment of the invention.

Incidentally, among reference characters in the drawings, reference numerals 10 and 50 designate buffered optical fibers, reference numerals 11 and 51 denote glass fibers, reference numerals 12 and 52 designate first coating layers, reference numerals 13 and 53 denote optical fibers, reference numeral 54 designates an inner layer, reference numeral 55 denotes an outer layer, reference numerals 16 and 56 designate second coating layers, reference character 56A denotes a coating end surface, reference numeral 17 designates a ferrule, reference character 17A denotes a hollow space, reference character 17B designates an abutting end surface of the ferrule, reference character 17C denotes an open end surface of the ferrule, reference 18 designates a connector, and reference numeral 19 denotes a buffered optical fiber terminated with a connector.

BEST MODE FOR CARRYING OUT THE INVENTION

Hereinafter, an embodiment of the invention is described in detail with reference to the drawings.

As shown in a schematic cross-sectional view of FIG. 1, a buffered optical fiber 10 according to an embodiment of the invention is provided with a second coating layer 16 on an outer peripheral surface of an optical fiber 13, in which a first coating layer 12 is provided on an outer peripheral surface of a glass fiber 11.

The second coating layer 16 is constituted by a second resin composition. The second resin composition does not contain halogenated materials. This means that the second resin composition does not contain a compound having a halogen group.

That is, the base polymer (hereafter referred to as a second polymer) of the second resin composition is a resin having no halogenated materials. Consequently, the second polymer has the property of producing no toxic gas when burning.

Preferably, the second polymer is a noncrystalline resin. Consequently, the buffered optical fiber 10 can more surely be formed so as to excel in optical transmission characteristics.

Incidentally, if the second polymer is a crystalline resin, the orientation of a material itself is enhanced. Especially when a buffered optical fiber is manufactured by extruding the polymer to an optical fiber that moves at a high speed, the second polymer is liable to provide residual thermal distortion at cabling to the glass fiber when manufacturing the buffered optical fiber. Consequently, the buffered optical fiber tends to have poor optical transmission characteristics. In this case, to reduce the generation of the residual thermal distortion at cabling, another process, such as annealing treatment, to be performed on the optical fiber is needed.

Preferably, the second resin composition comprises, as the second polymer, one of components selected from the group consisting of: a polystyrene-based polymer, a polystyrene-based elastomer, a mixture of polystyrene-based polymer and polyphenylene ether polymer, and a mixture of polystyrene-based elastomer and polyphenylene ether polymer.

Preferably, the second resin composition comprises a polystyrene-based thermoplastic polymer as the second polymer. Consequently, especially, the heat-resistance of the second coating layer is enhanced. Additionally, the adhesiveness between the second resin composition and an epoxy-based adhesive agent used when connected to a connector becomes favorable.

High impact polystyrene (HIPS), which is obtained by finely dispersing rubber components such as styrene-butadiene rubber, in polystyrene as domains, or the like, exemplifies the polystyrene-based thermoplastic polymer. Consequently, a buffered optical fiber that excels in optical transmission characteristics can surely be obtained.

Further, preferably, the second resin composition comprises as the second polymer polystyrene-based elastomer and polyphenylene ether polymer. Consequently, heat-resistance and flame retardancy can be enhanced.

Among block copolymers with a polystyrene hard segment and a diene polymer soft segment, such as polybutadiene, hydrogenerated polybutadiene, and polyisoprene, or ethylene-propylene rubber, a styrene-butadiene-styrene block copolymer (SBS) with a polybutadiene soft segment, a styrene-isoprene-styrene block copolymer (SIS) with isoprene soft segment, a styrene-(ethylene-butylene)-styrene block copolymer (SEBS) obtained by hydrogenating the SBS, and a styrene-(ethylene-propylene)-styrene block copolymer (SEPS) with a ethylene-propylene rubber soft segment, exemplify the polystyrene-based elastomer. Also, a styrene-ethylene-butylene-olefin crystalline copolymer (SEBC), which is a block copolymer of polystyrene and crystalline polyolefin, exemplifies the polystyrene-based elastomer.

Preferably, in the second polymer, the weight ratio of polystyrene-based elastomer to polyphenylene ether polymer is usually 8:2 to 2:8.

Further, in the second polymer, a part of the polystyrene-based polymer or the polystyrene-based elastomer may be subjected to acid-modification. Incidentally, the expression "subjected to acid-modification" means that a part of the molecular skeleton of the polystyrene-based polymer or the polystyrene-based elastomer is treated by an organic acid such as a maleic acid.

Additionally, in the case that the second polymer is only polyphenylene ether polymer similarly to the Prior Art 1, the polymer cannot be extruded due to an increase of back pressure in extrusion. Thus, the defective appearance of the buffered optical fiber occurs. Moreover, the buffered optical fiber has poor temperature change resistance characteristics (according to which higher-order optical transmission characteristics are maintained even when temperature varies). Thus, the residual thermal distortion at cabling tends to increase.

The second resin composition comprises the second polymer and 100 to 250 weight parts of metal hydroxide per 100 weight parts of the second polymer. Magnesium hydrate and aluminum hydroxide preferably exemplify the metal hydroxide.

Owing to the fact that metal hydroxide is contained in an amount equal to or more than 100 weight parts per 100 weight parts of the second polymer, the flame retardancy is enhanced. Further, owing to the fact that metal hydroxide is contained in an amount equal to or less than 250 weight parts per 100 weight parts of the second polymer, the extrusion processability of the second resin composition is ensured. Thus, the buffered layer shows good smooth.

The second resin composition comprises the second polymer and 10 to 100 weight parts of a nitrogen-based flame retardant material per 100 weight parts of the second polymer.

The nitrogen-based flame retardant material is not limited to specific ones, as long as the nitrogen-based flame retardant material does not have a halogen group. Melamine cyanurate, melamine derivatives, tris (β-cyanoethyl) isocyanurate, and the like can be cited as the nitrogen-based flame retardant material. A buffered optical fiber having high flame retardancy can be realized by employing such a nitrogen-based flame retardant material. Additionally, the generation of toxic gas and polyphosphoric acid when burning the buffered optical fiber can be reduced. Thus, the buffered optical fiber which does not pollute the environmental system, can be realized.

When the nitrogen-based flame retardant material is contained in an amount less than 10 weight parts per 100 weight parts of the second polymer, the flame retardancy is not sufficiently exhibited. Conversely, when the nitrogen-based flame retardant material is contained in an amount exceeding 100 weight parts per 100 weight parts of the second polymer, a defective appearance occurs on the surface of the buffered optical fiber.

As described above, the buffered optical fiber according to the invention is adapted so that the second coating layer adds 100 to 250 weight parts of metal hydroxide and 10 to 100 weight parts of a nitrogen-based flame retardant material to 100 weight parts of the second polymer. With such constitution, metal hydroxide exhibiting endothermy when burnt is added to the second polymer, and the nitrogen-based flame retardant material having the effect of reducing combustion is also added to the second polymer. Thus, high flame retardancy can be exhibited. Moreover, less than 250 weight parts of metal hydroxide and less than 100 weight parts of a nitrogen-based flame retardant material are added to the second polymer. Thus, when the buffered optical fiber is manufactured, the coating of the optical fiber can favorably be performed by extruding the resin composition to the optical fiber.

Preferably, a Young's modulus of the second coating layer 16 at 25° C. is 100 MPa to 800 MPa. Incidentally, the Young's modulus is one that is measured according to JIS K7113 by using a test piece No. 2.

Preferably, the Young's modulus of the second coating layer 16 is set within the aforementioned range by adjusting the kind and the content of the second polymer constituting the second resin composition, the kind and the content of the nitrogen-based frame retardant material, and the kind and the content of the following additive agent.

The second resin composition may comprise additives such as a hindered amine light stabilizer (HALS), an oxidation inhibitor (sulfur-based oxidation inhibitor or the like), a lubricant, an antioxidant, and the like, according to the usage requirements. LA-52 (tetrakis (1,2,2,6,6-pentamethyl-4-piperidyl) 1,2,3,4-butanetetracarboxylate manufactured by Asahi Denka Co., Ltd.), and the like exemplify the light stabilizer. Seenox 412S (pentaerythrithol tetrakis (3-laurylthiopropionate)) or the like exemplifies the sulfur-based oxidation inhibitor. The use of light stabilizer and the sulfur-based oxidation inhibitor enhances the light stability and the moisture and heat resistance of the second coating layer are enhanced, so that the light stabilizer and the sulfur-based oxidation inhibitor are preferable.

Alternatively, the Young's modulus of the second coating layer 16 may be set within the aforementioned range by performing a method of adding known plasticizer, softener, rubber softener, process oil, extender oil, and compounding agents, such as a crosslinking agent, to the second polymer as additives. Paraffinic oil, nonaromatic rubber softener, or the like may be cited as the rubber softener.

Preferably, the second resin composition is constituted by mixing its constituents with one another. The constituents can be mixed by using a known melt blender, such as a Banbury mixer, a pressure kneader, or a biaxial mixer.

Preferably, the optical fiber 13 used in the buffered optical fiber 10 according to the invention is provided with an ultraviolet curable resin layer as the first coating layer 12 on the outer peripheral surface of the glass fiber 11. Concretely, an optical fiber having an outside diameter (Dp) of 0.240 mm to 0.260 mm, which is produced by coating a glass fiber 11 having an outside diameter of 0.125 mm with an ultraviolet curable resin layer, preferably exemplifies the optical fiber 13. The glass fiber 11 comprises silica glass as a principal constituent. Urethane acrylate polymers or the like are widely known as the polymer for the ultraviolet curable resin layer 12. These polymers can be used without limitation. Further, a layer (having a two-layer structure) constituted by an inner layer and an outer layer that differ from each other in physical property values, or a layer including a colored layer as the outermost layer is known as the ultraviolet curable resin layer 12. These layers can also be used without restrictions.

Preferably, a Young's modulus of the first ultraviolet curable resin layer is set to be 0.5 MPa to 2 MPa, that of the second ultraviolet curable resin layer is set to be 5 MPa to 1500 MPa, and that of the colored layer is set to be 500 MPa to 1500 MPa.

It is preferable for realizing such a Young's modulus to manufacture the polymer of the first ultraviolet curable resin layer by mixing urethane acrylate, which is obtained by causing polyetherdiol, isophoronediisocyanate, and hydroxymethyl acrylate to react with one another, and N-vinyl caprolactam, isobornyl acrylate, nonanediol acrylate, and nonylphenol acrylate, which are polymeric unsaturated monomers, and Lucirin TPO, which is (manufactured by BASF corporation) as a photoinitiator, and tetrakis-{methylene-3-(3-5-di-t-butyl-4-hydroxyphenyl) propionate}methane, γ-mercaptopropyltrimethoxysilane and 2,2,6,6-tetramethyl-4-piperidyl alcohol, which are employed as other additives, and by then irradiating ultraviolet light thereon.

Preferably, the manufacture of the polymer of the second ultraviolet curable resin layer is performed by mixing urethane acrylate, which is obtained by causing polypropylene oxide glycol, toluene diisocyanate, and hydroxyethyl acrylate to react with one another, and N-vinyl caprolactam, and tricyclodecanedimethanol acrylate, which are polymeric unsaturated monomers, and Lucirin TPO, which are (manufactured by BASF corporation), and Irgacure 184 (manufactured by Ciba Specialty Chemicals Inc.) as photoinitiators, and tetrakis-{methylene-3-(3-5-di-t-butyl-4-hydroxyphenyl) propionate}methane, which is employed as another additive, and by then irradiating ultraviolet light thereon.

Furthermore, the colored layer is usually formed as an ultraviolet curable resin layer. The manufacture of the polymer of the colored layer is performed by mixing epoxy acrylate, which is obtained by causing bisphenol A and 2-hydroxybutyl (meth) acrylate to react with each other, and/or urethane acrylate, which is obtained by causing polypropylene oxide glycol, toluene diisocyanate, and hydroxyethyl acrylate to react with one another, and bisphenol A-ethylene oxide-modified acrylate, trimethylolpropane trioxyethyl (meth)acrylate, and silicon acrylate, which are employed as polymeric unsaturated monomers, and benzophenone and benzoin ether polymer, which are employed as photoinitiators, and tetrakis-{methylene-3-(3-5-di-t-butyl-4-hydroxyphenyl) propionate}methane, which is employed as another additive, and by then irradiating ultraviolet light thereon.

Thus, the first ultraviolet curable resin layer is set to be a flexible layer, while the second ultraviolet curable resin layer is set to be a solid layer. Consequently, a side pressure (an external pressure received from the outer peripheral surface of the optical fiber 13, especially the pressure received before the second resin layer 16 is provided on the optical fiber 13), which the optical fiber 13 receives, is absorbed by the second ultraviolet curable resin layer. When this pressure is too large for the second ultraviolet curable resin layer to completely absorb, this pressure is buffered by the first ultraviolet curable resin layer to thereby reduce optical transmission loss caused by the reception of the pressure by the glass fiber 11.

Preferred dimensions of the layers constituting the optical fiber 13 are described below:

the outside diameter of the glass fiber 11: 125 μm.

the outside diameter of a concentric part including up to the first ultraviolet curable resin layer: 200 μm.

the outside diameter of the concentric part including up to the second ultraviolet curable resin layer: 245 μm.

the outside diameter of the concentric part including up to the colored layer: 255 μm.

A form, in which the diameter (Ds) of the concentric part including up to the second coated layer 16 is 0.8 mm to 1.0 mm, preferably exemplifies the form of the buffered optical fiber 10 according to the embodiment of the invention.

The buffered optical fiber 10 according to the embodiment of the invention is preferably manufactured by applying the second resin composition, which constitutes the second coating layer 16, onto the optical fiber 13, as will be described hereinbelow.

Figure 2:
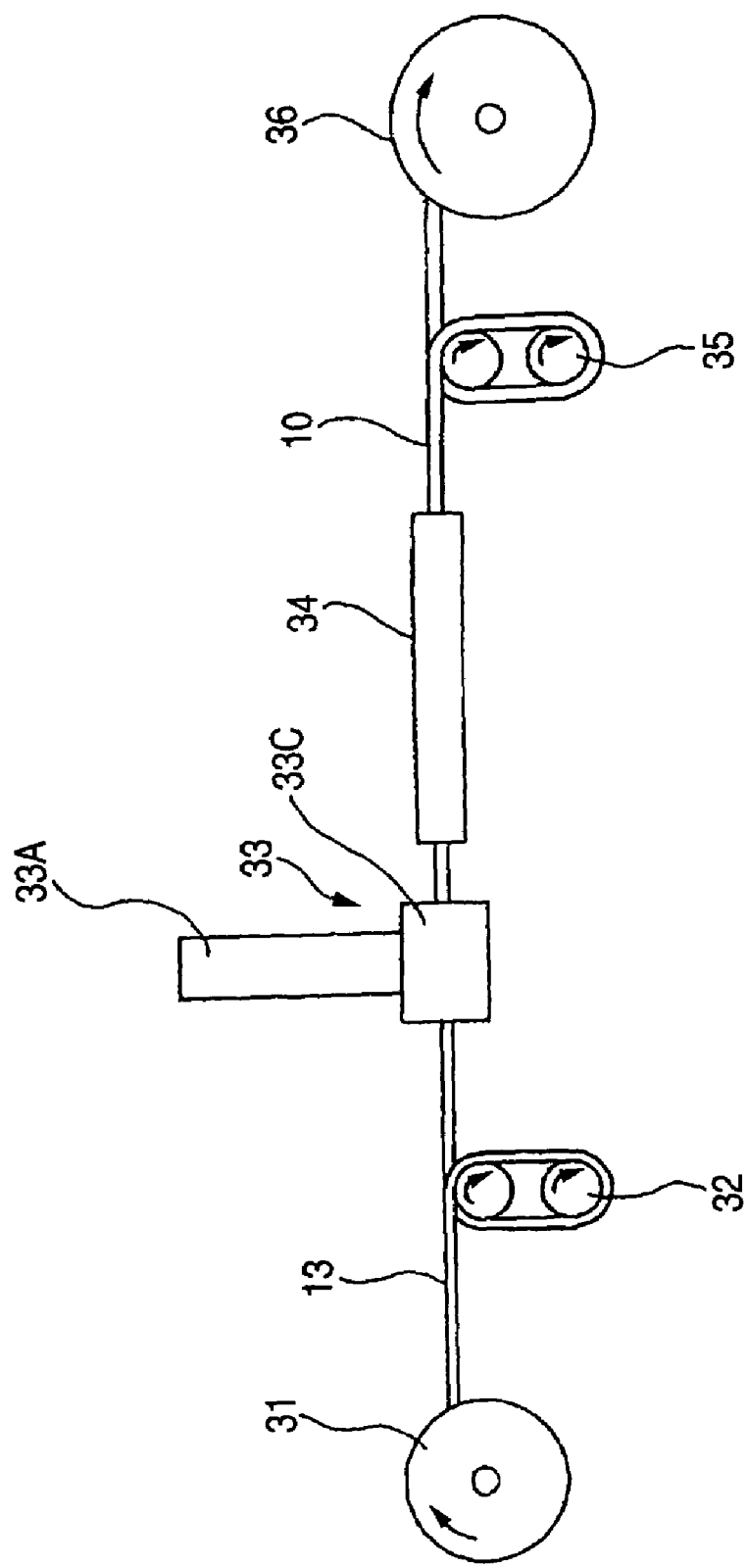
FIG. 2 is a view illustrating the manufacture of the buffered optical fiber according to the embodiment of the invention.

That is, as shown in FIG. 2, the optical fiber 13 is unreeled from a supply reel 31 and supplied to an extruder 33 through a tension control unit 32. Incidentally, the extruder 33 has an accommodating portion 33A in which the second resin composition is accommodated, and a crosshead 33C enabled to apply the second resin composition onto the outer periphery of the optical fiber 13 by extruding the second resin composition. Preferably, the second resin composition is applied onto the outer periphery of the optical fiber 13 when the second resin composition is put in a molten state. Usually, the extruder 33 has a heater (not shown) at a predetermined place.

Subsequently, the optical fiber with the second resin composition which is extruded from the extruder 33 is led to a cooling water tank 34 thereby to cool and cure the outer coating 16. Thus, the buffered optical fiber 10 is formed. Then, the buffered optical fiber 10 is wound onto a takeup reel 36 through a tension control unit 35.

Figure 3:
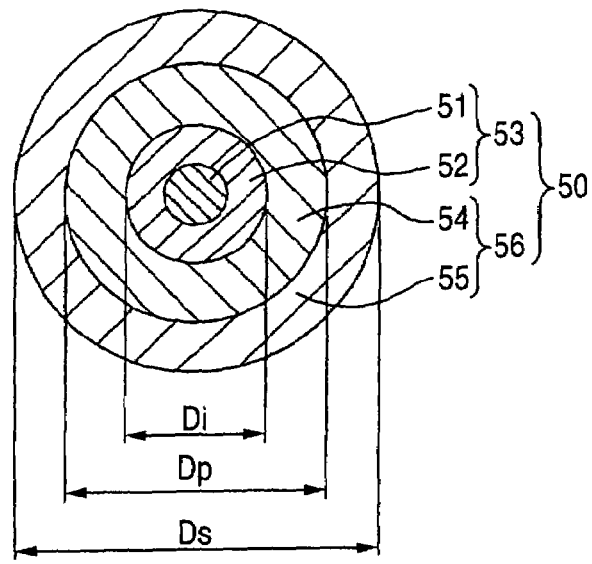
FIG. 3(A) is a schematic cross-sectional view of a buffered optical fiber according to an embodiment of the invention.
FIG. 3(B) is a schematic cross-sectional view of an optical fiber according to the embodiment of the invention.
Figure 3:
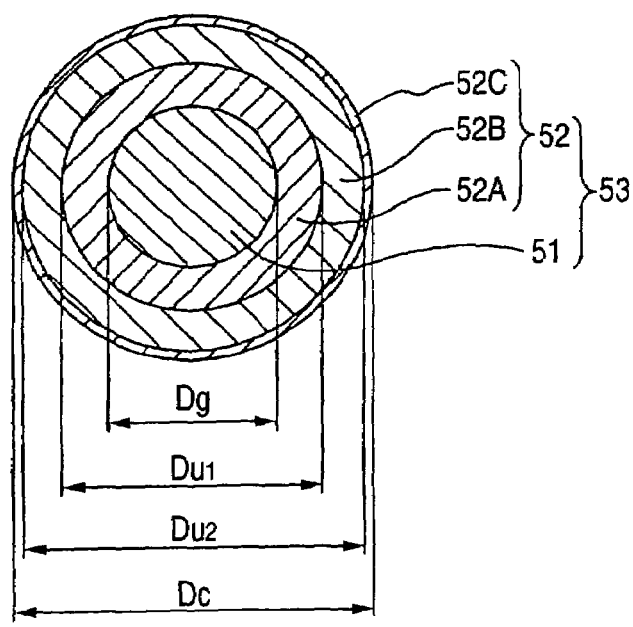

In the buffered optical fiber 10 according to this embodiment, the second coating layer 16 may have either a form in which the second coating layer 16 is constituted by a single coating layer, or a form in which the second coating layer 16 consists of two or more coating sublayers. FIG. 3(A) shows a schematic cross-sectional view of the buffered optical fiber 50 in which the second coating layer comprises two or more coating sublayers.

As shown in FIG. 3(A), in the buffered optical fiber 50 according to the embodiment of the invention, an inner layer 54 and an outer layer 55 are serially provided as the sublayers of the second coating layer 56 on an outer peripheral surface of the optical fiber 53, which is provided with the first coating layer 52 on the outer periphery of the glass fiber 51, in the direction in which the layers are away from the glass fiber 51. Incidentally, as shown in a schematic cross-sectional view in FIG. 3B, the first coating layer 52 is provided with the first ultraviolet curable resin layer 52A, the second ultraviolet curable resin layer 52B, and the colored layer 52C serially arranged in a direction in which these layers are away from the glass fiber 51.

In the second coating layer 56, both the resin compositions respectively constituting the inner layer 54 and the outer layer 55 are collectively set to be the second resin composition. The second resin composition used in this second coating layer 56 comprises the base polymer (the polymer constituting the inner layer and the outer layer), and 100 to 250 weight parts of metal hydroxide and 10 to 100 weight parts of a nitrogen-based flame retardant material per 100 weight parts of the base polymer, and does not contain halogenated materials, similarly to the second resin composition used in the aforementioned second coating layer 16 (FIG. 1). Additives, such as a hindered amine light stabilizer (HALS), an oxidation inhibitor (sulfur-based oxidation inhibitor or the like), a lubricant, an antioxidant, etc. can be added to the base polymer.

Preferably, in the buffered optical fiber 50, the inner layer 54 employs polystyrene-based thermoplastic polymer, polyolefin-based thermoplastic polymer, or polyphenylene ether polymer, or a mixed polymer of these materials as the base polymer. Preferably, the inner layer 54 is adapted so that 100 to 250 weight parts of metal hydroxide and less than 100 weight parts of a nitrogen-based flame retardant material per 100 weight parts of the base polymer constituting the inner layer 54 are added to the base polymer.

Preferably, the outer layer 55 employs a polystyrene-based thermoplastic polymer, a polyolefin-based thermoplastic polymer, or a polyphenylene ether polymer, or a mixed polymer of these materials as the base polymer. Preferably, the outer layer 55 is adapted so that 100 to 250 weight parts of metal hydroxide and less than 100 weight parts of a nitrogen-based flame retardant material per 100 weight parts of the base polymer constituting the outer layer 55 are added to the base polymer.

Preferably, in the buffered optical fiber 50 according to the embodiment of this invention, the Young's modulus of the inner layer 54 is 1 MPa to 100 MPa (more preferably, 5 MPa to 50 MPa). Preferably, in the buffered optical fiber 50 according to the embodiment of this invention, the Young's modulus of the outer layer 55 is 200 MPa to 1500 MPa (more preferably, 250 MPa to 1000 MPa). Preferably, the outside diameter (Dp) of a concentric part including up to the inner layer 54 is 0.3 mmφ to 0.7 mmφ (more preferably, 0.35 mmφ to 0.60 mmφ). Preferably, the outside diameter (Ds) of the concentric part including up to the outer layer 55 is 0.75 mmφ to 1.0 mmφ

(more preferably, 0.85 mmϕ to 0.95 mmϕ). Incidentally, the Young's moduli of the inner layer 54 and the outer layer 55 are preferably adjusted according to the kinds and the additions of compounds constituting the inner layer 54 and the outer layer 55.

Thus, the first ultraviolet curable resin layer is set to be a flexible layer, while the second ultraviolet curable resin layer is set to be a solid layer. Consequently, a side pressure (an external pressure received from the outer peripheral surface of the buffered optical fiber 50), which the buffered optical fiber 50 receives, is absorbed by outer layer 55. Even when this pressure is too large for the outer layer 55 to completely absorb, this pressure can be buffered by the inner layer 54 to thereby reduce optical transmission loss caused by the reception of the pressure by the glass fiber 51.

Next, the first coating layer 52 of the buffered optical fiber 50 is described. Preferably, the Young's modulus of the first ultraviolet curable resin layer 52A is 0.5 MPa to 2 MPa. Preferably, the Young's modulus of the second ultraviolet curable resin layer 52B is 5 MPa to 1500 MPa, and that of the colored layer 52C is 500 MPa to 1500 MPa.

More preferably, the Young's modulus of the second ultraviolet curable resin layer 52B is 5 MPa to 600 MPa. Where the Young's modulus of the second ultraviolet curable resin layer 52B is less than 5 MPa, the external pressure is difficult to absorb and consequently the glass fiber becomes easily damaged. On the other hand, where the Young's modulus exceeds 600 MPa, it is difficult for a blade of a coating removing tool 20 (to be described later) to cut into the second ultraviolet curable resin layer 52B. Thus, the first coating layer 52 is difficult to remove from the buffered optical fiber.

As shown in FIG. 3(B), the buffered optical fiber 50 according to the embodiment of the invention is configured so that the first coating layer 52 is provided with the first ultraviolet curable resin layer 52A, the second ultraviolet curable resin layer 52B, and the colored layer 52C arranged in a direction in which these layers are away from the glass fiber 51. To obtain such a buffered optical fiber 50, it is usual to first provide the first ultraviolet thermal-curable resin layer 52A and the second ultraviolet thermal-curable resin layer 52B on the outer periphery of the glass fiber 51, and to then provide the colored layer 52C thereon by using a resin applying device and an ultraviolet irradiating device. Consequently, the optical fiber 53 can preferably be obtained.

A composition obtained by adding a pigment (an organic pigment or the like) that serves as a coloring agent and a publicly known pigment dispersing agent to the ultraviolet curable resin composition can exemplify a coloring agent composition constituting the colored layer 52C. Further, the coloring agent composition can preferably comprise other curable oligomers, such as epoxy (meth)acrylate, urethane acrylate, or ester-based acrylate, as polymeric oligomers.

Preferred dimensions of the layers constituting the optical fiber 53 are described below:

the outside diameter ($D_g$) of the glass fiber 51: 125 μm.

the outside diameter ($D_{u1}$) of a concentric part including up to the first ultraviolet curable resin layer 52A : 200 μm.

the outside diameter ($D_{u2}$) of the concentric part including up to the second ultraviolet curable resin layer 52B: 245 μm.

the outside diameter ($D_c$) of the concentric part including up to the colored layer 52C: 255 μm.

Subsequently, the second coating layer 56 is applied on the outer periphery of the optical fiber 53 obtained in the aforementioned way. Thus, the buffered optical fiber 50 can preferably be manufactured.

Figure 4:
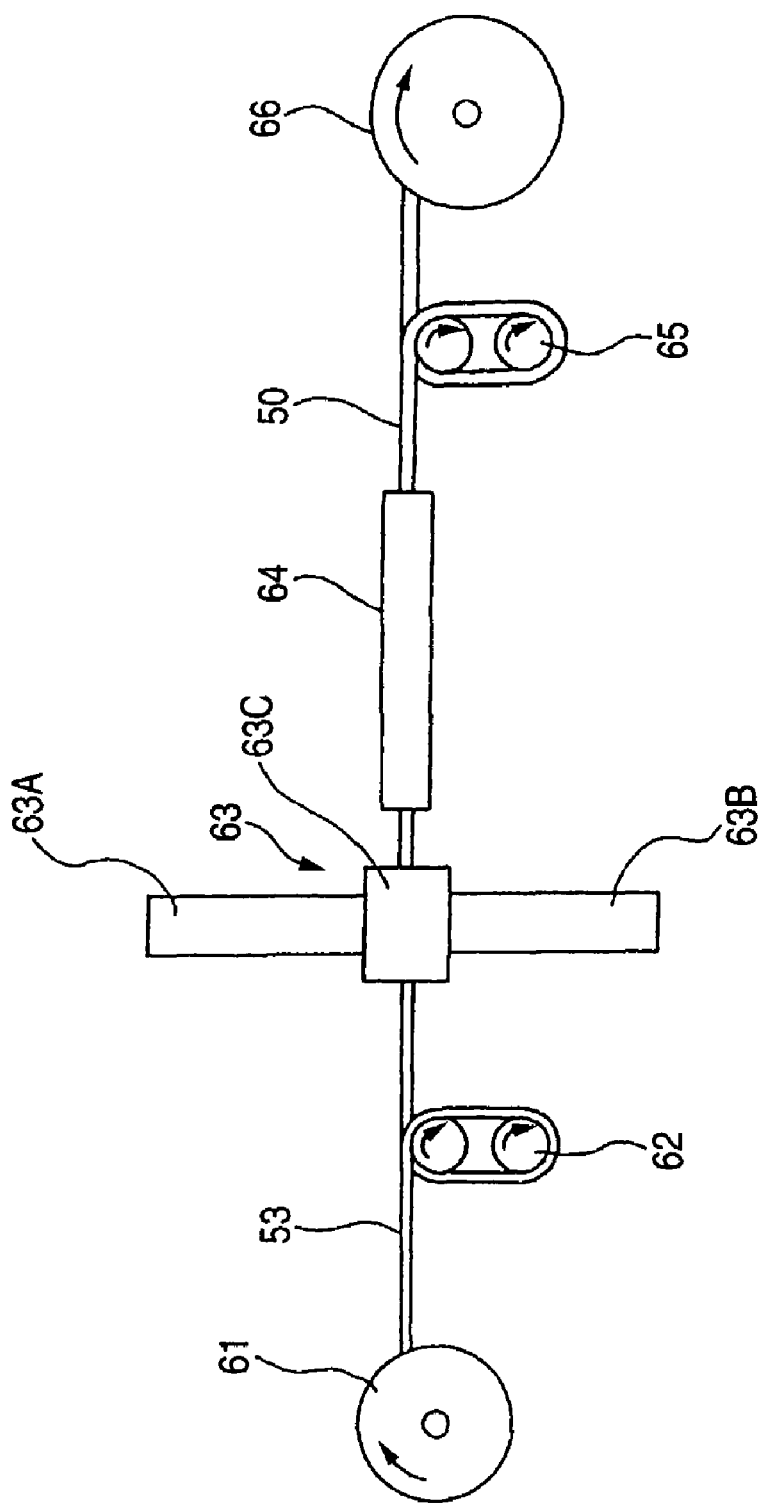
FIG. 4 is a view illustrating the manufacture of the buffered optical fiber according to the embodiment of the invention.

That is, as shown in FIG. 4, the optical fiber 53 is unreeled from a supply reel 61 and supplied to an extruder 63 through a tension control unit 62. Incidentally, the extruder 63 has a first accommodating portion 63A in which the composition of the inner layer 54 is accommodated, a second accommodating portion 63B in which the composition of the outer layer 55 is accommodated, and a crosshead 63C enabled to apply the second coating layer 56 onto the outer periphery of the optical fiber 53 by sequentially extruding the composition of the inner layer 54 and that of the outer layer 55. Preferably, the composition of the inner layer 54 and that of the outer layer 55 are applied onto the outer periphery of the optical fiber 53 when the compositions are put in a molten state. Usually, the extruder 63 has a heater (not shown) at a predetermined place.

Subsequently, the optical fiber with inner and outer layers which is extruded from the extruder 63 are led to a cooling water tank 64 thereby to cool and cure the second coating layer 56. Thus, the buffered optical fiber 50 is formed.

Preferably, the buffered optical fibers 10 and 50 is constituted so that an amount of transmission loss variation (dB/km) defined below is equal to or less than 0.2 dB/km, and that more preferably, the amount of transmission loss variation is equal to or less than 0.1 dB/km:

THE AMOUNT OF TRANSMISSION LOSS VARIATION: the difference in quantity between the maximum loss variation and the minimum loss variation in a transmission loss amount (in dB/km at a wavelength of 1.55 μm and including a transmission loss amount generated just after the test is started) generated during a heat cycle test performed by repeating a heat cycle consisting of 0.5 hours, in which temperature is held at $(-40)°$ C., and 0.5 hours, in which temperature is held at 85° C.

To meet conditions relating to the heat cycle test, preferably, the first resin composition constituting the first coating layer comprises a first polymer constituted by the ultraviolet curable resin, and the second coating layer has a single-layer structure. Incidentally, the first polymer means the polymer of the first resin composition.

Additionally, in the case of the buffered optical fiber adapted so that the first polymer is a silicone resin composition, that the second coating layer comprises a resin composition containing polyphenylene oxide, that the outside diameter of a concentric part including up to the first coating layer is 0.4 mm, and that the outside diameter of the concentric part including up to the second coating layer is 0.8 mm, similarly to prior art 1, the difference in the linear expansion coefficient between the first coating layer and the second coating layer becomes obvious. This may be caused due to a large thickness of the first coating layer. Consequently, when the buffered optical fiber according to prior art 1 undergoes abrupt changes in temperature, uneven stress is applied to the glass fiber. Thus, the glass fiber is easily distorted. The amount of transmission loss variation at the heat cycle test is large. Consequently, in the case of the buffered optical fiber according to prior art 1, the transmission loss due to the change in temperature increases.

Further, to meet the conditions relating to the heat cycle test, preferably, the linear expansion coefficient of the second resin composition is equal to or less than $4.0 \times 10^{-4}$ (1/K). Incidentally, this linear expansion coefficient is that of a sheet formed by curing the second resin composition.

When the linear expansion coefficient of the second resin composition exceeds $4.0 \times 10^{-4}$ (1/K), an amount of expansion or contraction of the second resin composition increases due to the change in temperature. Thus, stress and minute bend are generated in the glass fiber. Consequently, the amount of the transmission loss variation tends to exceed 0.2 dB/km.

Further, preferably, the buffered optical fibers 10 and 50 according to the embodiment of the invention are constituted so that residual thermal distortion at cabling defined below is equal to or less than 150 μm:

THE RESIDUAL THERMAL DISTORTION AT CABLING: the distance between an end surface of said glass fiber and that of said second coating layer in said buffered optical fiber heat-treated at 120° C. for 168 hours.

As a result of setting the residual thermal distortion at cabling within the aforementioned range, thermal stress applied to the glass fiber (and the first coating layer) during extrusion-molding is small. Thus, it is estimated that even when temperature varies due to the heat cycle test or the like, deterioration in the characteristics, such as the increase in the transmission loss due to the change in temperature, would be small. Also, as a result of setting the residual thermal distortion at cabling within the aforementioned range, an amount of relative movement in the direction of length between the glass fiber and the coating layer is small. Thus, the buffered optical fiber of the invention excels in the property of pistoning (the property by which the first coating including the glass fiber is projected from an end surface of the second coating layer by applying abrupt changes in temperature to the buffered optical fiber for a long time).

Incidentally, the device according to prior art 2 is a cable (or electric wire) adapted so that the flame retardant material (no nitrogen-based flame retardant material is intended) is added to at least the outer surface and the overall sheath of the insulator covering the conductor. Patent document 2 describes a material for the insulator according to prior art 2, which comprises polyphenylene oxide, low-density polyethylene and SEBS as resin components. Even in the case of such an electric cable, an end surface of the conductor may protrude from the end surface of the insulator (this phenomenon is sometimes referred to as "protrusion"). However, even when the "protrusion" occurs, for example, in the case that such a cable is connected to another communication member at its end surface, a conduction failure is not actualized. However, when the "protrusion" occurs in the case that the buffered optical fiber is connected to another communication member at its end surface, unintended stress is applied to the glass fiber, so that the optical transmission characteristics are degraded, and that the glass fiber is broken in the worst case.

Therefore, even when the insulator according to prior art 2 is applied to the buffered optical fiber according to prior art 1, the insulator according to prior art 2 differs from the insulator of the buffered optical fiber according to the embodiment of the invention, in that the former insulator comprises no nitrogen-based flame retardant material. Thus, the buffered optical fiber according to the embodiment of the invention is not obtained from the prior art. Additionally, it is not ordinarily considered by those skilled in the art that the insulator according to prior art 2, which causes the problem of the "protrusion" of the optical fiber, is applied to the buffered optical fiber according to the embodiment of the invention.

The aforementioned conditions, in which "the linear expansion coefficient of the second resin composition is set to be equal to or less than $4.0 \times 10^{-4}$ (1/K), and in which "the defined residual thermal distortion at cabling is set to be equal to or less than 150 μm", are attained by making the second resin composition comprise 100 to 250 weight parts of the metal hydroxide per 100 weight parts of the second resin composition.

To manufacture the buffered optical fiber terminated with a connector according to the embodiment of the invention, preferably, the first resin composition constituting the first coating layer comprises the first polymer constituted by the ultraviolet curable resin. Additionally, the buffered optical fiber, whose second coating layer has a two- or more-layer structure, is used. Hereinafter, the buffered optical fiber, which is terminated with the connector, manufactured by using the buffered optical fiber 50, whose second coating layer has a two-layer structure, is described.

Figure 5:
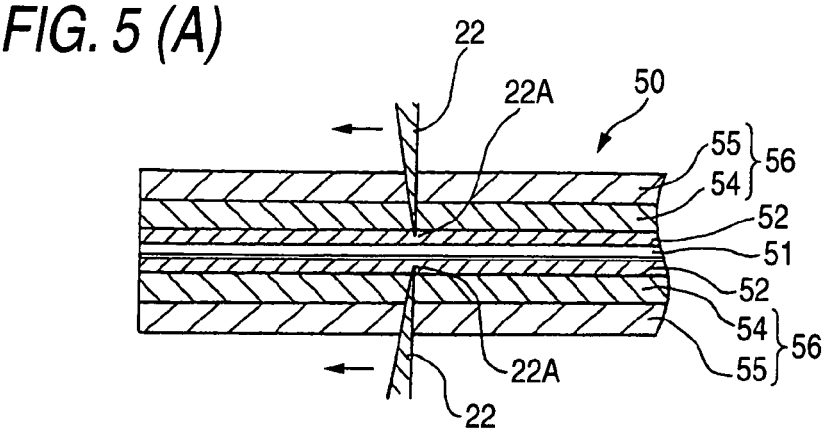
FIGS. 5(A), 5(B), and 5(C) are views illustrating the removal of a coating of the buffered optical fiber according to the embodiment of the invention.
Figure 5:
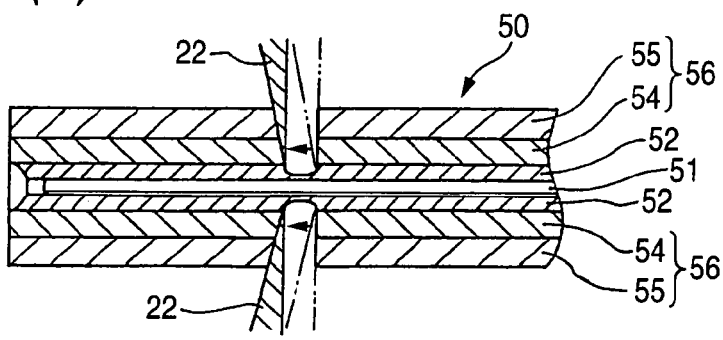
Figure 5:
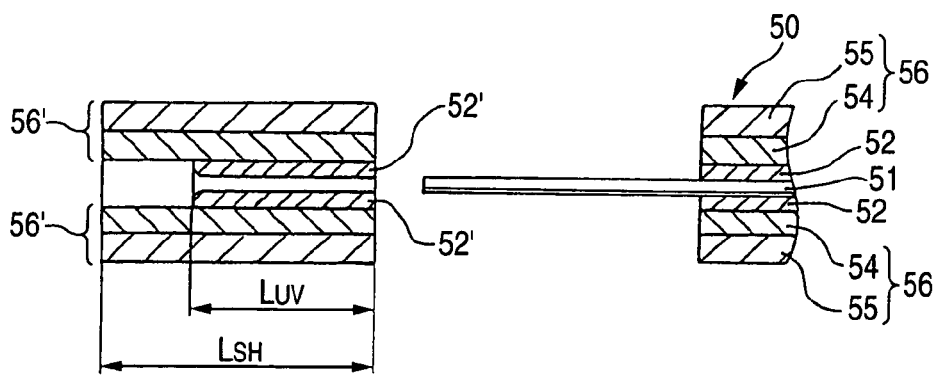
Figure 7:
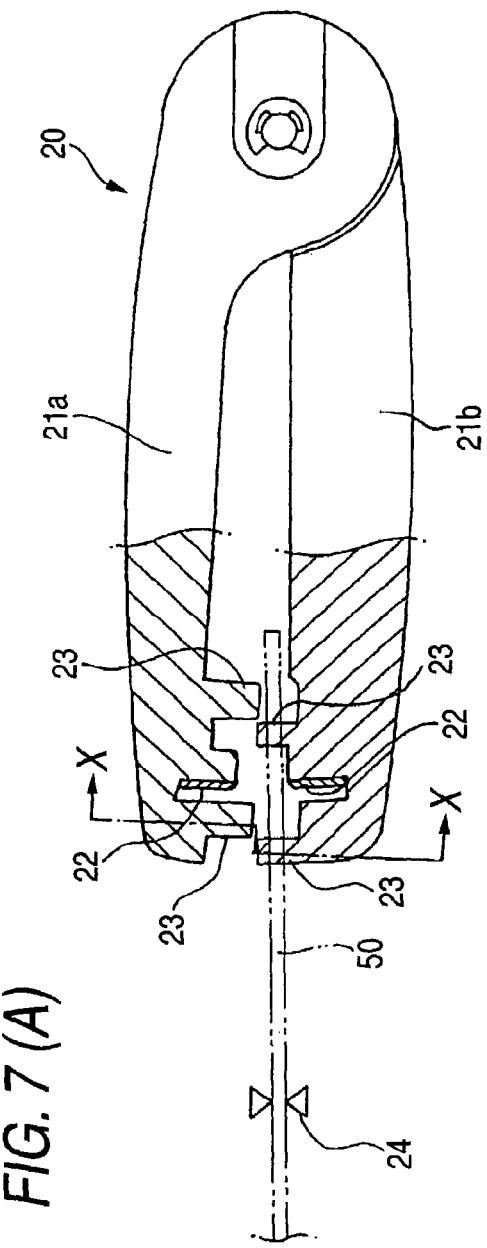
FIGS. 7(A) and 7(B) are views showing a coating removing tool used for removing a coating of the buffered optical fiber.
Figure 7:
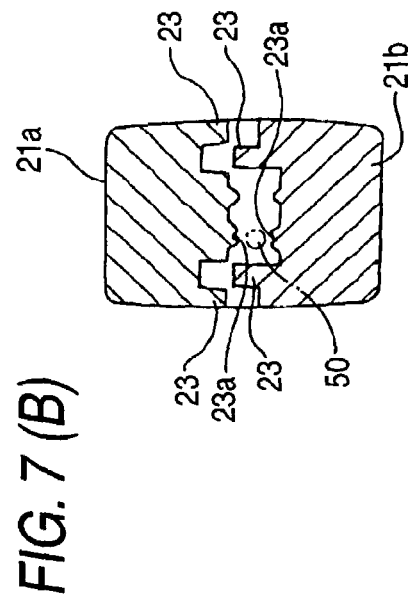

First, a terminal of the buffered optical fiber 50 is processed by using the coating removing tool 20 (see FIG. 7). The buffered optical fiber 50 is held in a V-groove 23a of the coating removing tool 20. Then, a part of the buffered optical fiber 50, which is positioned at a distance of about 30 mm to 100 mm from the terminal of the buffered optical fiber 50, is pinched by a fastening tool 24. Subsequently, plate-like lever members 21a, 21b are closed to thereby make a cut in the buffered optical fiber. Incidentally, as shown in FIG. 5(A), the coating removing tool 20 is configured so that a cutting edge 22A (corresponding to an apex of the cut) of a blade 22 does not reach the glass fiber when the plate-like lever members 21a and 21b are in contact with each other. Thus, the glass fiber 51 is not damaged. Moreover, the second coating layer 56 is surely cut off.

Subsequently, the blade is moved in the direction of the arrows shown in FIG. 5(A). Then, the first coating layer 52 and the second coating layer 56 are separated from the glass fiber 51 so as to be drawn out from the glass fiber. The second coating layer 56 is completely cutoff. Thus, the second coating layer 56 moves together with the blade 22. Conversely, the first coating layer 52 is not completely cut off (the apex of the cut is positioned in the first coating layer 52). Thus, even when the blade 22 moves, the first coating layer 52 is stretched for a time. A part of the first coating layer 52, which closely adheres to the glass fiber 51, is not moved together with the blade 22 (see FIG. 5(B)). During this period, the second coating layer 56 slides on the first coating layer 52. Further, a part of the first coating layer 52, which is placed in the vicinity of the blade 22, is compressed thereat. Then, when the coating removing tool 20 is moved still more, the first coating layer 52 is torn off. Thus, the first coating layer 52' is compressed by the separated and removed piece of the coating. Consequently, the length in a drawing-out direction of the first coating layer 52' is shorter than that in the drawing-out direction of the second coating layer 56' (see FIG. 5(C)).

Preferably, the buffered optical fiber 50 according to the embodiment of the invention is configured so that the "length ($L_{uv}$) of the first coating layer 52' in the separated and removed piece of the coating divided by the length ($L_{SH}$) of the separated second coating layer 56'" (hereunder expressed as "$L_{uv}/L_{SH}$") is 15% to 85%. Incidentally, a case, in which no ultraviolet curable resin layer is present in the separated resin layer, is defined as "$L_{uv}/L_{SH}$=0%". A case, in which the length in the drawing-out direction of the ultraviolet curable resin layer is equal to that in the drawing-out direction of the resin coating layer, is defined as "$L_{uv}/L_{SH}$=100%". Consequently, the slidability of the first coating layer 52' on the second coating layer 56' is appropriately adjusted. Thus, residue of the first coating layer 52 on the glass fiber is not frequently caused. Moreover, the breakage of the glass fiber 51 does not frequently occur. Because there is no residue of the ultraviolet curable resin layer, it is hard for optical connection loss to occur when the connector is connected to the buffered optical fiber.

The force of closing the plate-like levers 21a and 21b to separate a composite coating, which is obtained by adding the second coating layer 56 to the first coating layer 52, from the glass fiber 51 by using the coating removing tool 20 is usually 2 kgf or so. The rate, at which the first coating layer 52 and the second coating layer 56 are removed from the glass fiber, is about 500 mm/min. The force of drawing out the first coating layer 52 and the second coating layer 56 by moving the coating removing tool 20 at that time is a drawing-out force.

To set $L_{uv}/L_{SH}$ at 15% to 85%, preferably, the friction coefficient between the colored layer 52C (the outermost layer of the first coating layer 52) and the inner layer 54 is adjusted to 0.2 to 0.5.

A method of adjusting the kinds and additions of compounds constituting these layers can be cited as the method of setting the friction coefficient between the colored layer 52c and the inner layer 54 to be within the aforementioned range. A method of adjusting the aforementioned friction coefficient by adding a decoupling agent to the colored layer 52c or to the inner layer 54 can preferably be cited.

The colored layer 52c containing the decoupling agent is preferably obtained by using a colored layer composition to which silicone-based acrylate is added as a part of a reactive diluent monomer. Alternatively, silicone oil may be added to the colored composition as the decoupling agent.

Further, silicone compounds, such as silicone oil and decoupling silicone (varnish, rubber mold), can be cited as the decoupling agent to be added to the inner layer 54. To obtain the friction coefficient in the aforementioned range, usually, the decoupling agents in the range of 0.5 to 10 weight parts per 100 weight parts of the resin constituting the inner layer 54 are added to the resin constituting the inner layer.

In this case, more specifically, in view of the Young's moduli of the inner layer 54 and the outer layer 55, preferably, the compositions of the inner layer 54 and the outer layer 55 are set to be as follows.

THE INNER LAYER: 100 to 250 weight parts of metal hydroxide and less than 100 weight parts of a nitrogen-based flame retardant material are contained per 100 weight parts of polyolefin-based thermoplastic polymer.

THE OUTER LAYER: 100 to 250 weight parts of metal hydroxide and less than 100 weight parts of a nitrogen-based flame retardant material are contained per 100 weight parts of polyolefin-based thermoplastic polymer and/or thermoplastic elastomer polymer.

Further, preferably, the drawing-out force at the time of drawing out the first coating layer 52 and the second coating layer 56 from the glass fiber 51 is equal to or less than 2.5 kgf. Consequently, the first coating layer 52 and the second coating layer 56 are easily drawn out from the glass fiber (without feeling a large load) by using the coating removing tool 20, thereby to expose the glass fiber 51. According to the invention, the drawing-out force is defined as a force applied in the direction of drawing out the resin layer (that is, the force of pulling the coating removing tool 20).

To set the drawing-out force to be equal to or less than 2.5 kgf, this setting can be handled by improving materials, which excel in melt flow ratio during extrusion, and a process (the shape of a screw, the shape of a die point) of reducing a back pressure in extrusion, as described in the description of examples.

Next, the buffered optical fiber terminated with the connector according to the embodiment of the invention is described.

Figure 6:
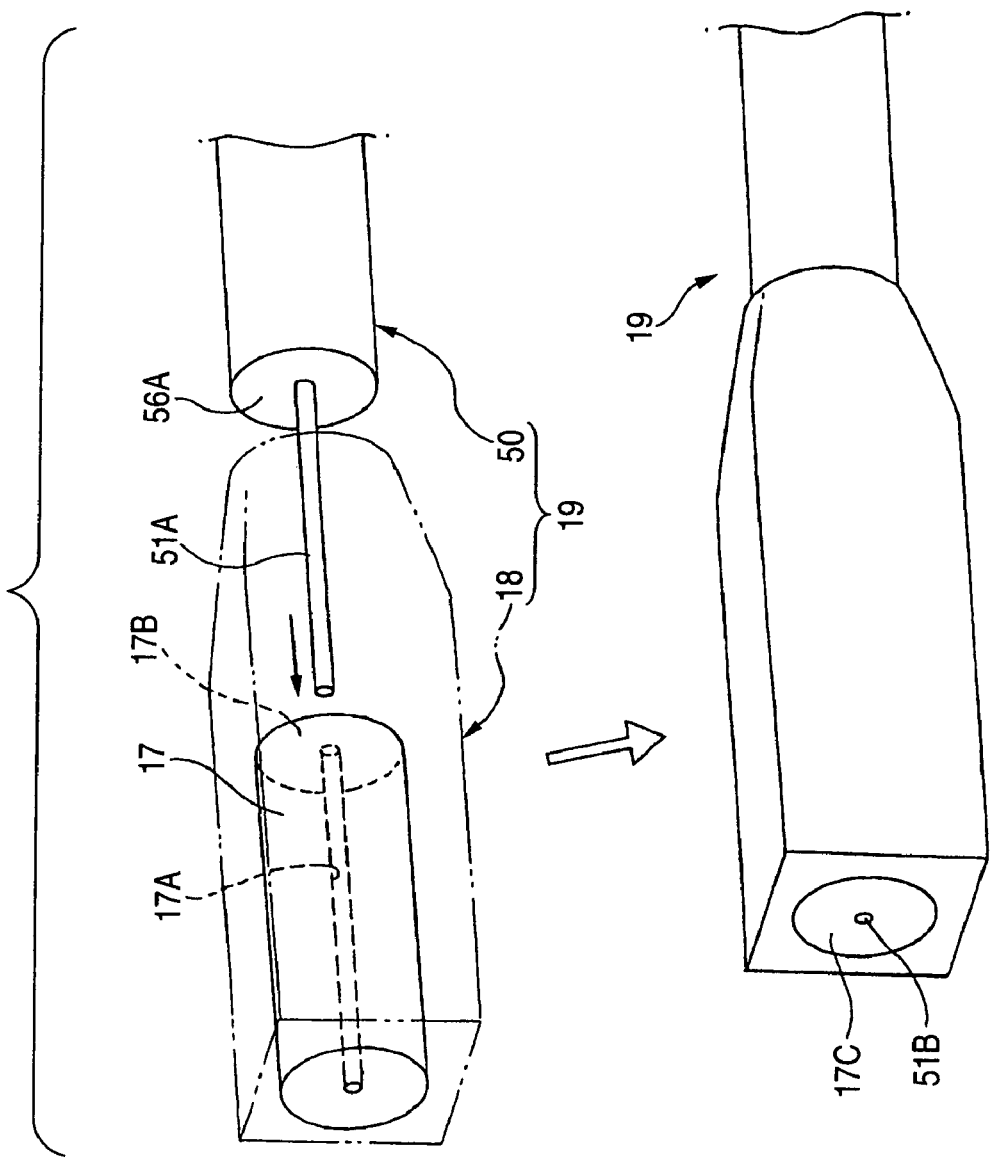
FIG. 6 is a view illustrating the manufacture of a buffered optical fiber terminated with a connector according to the embodiment of the invention.

The buffered optical fiber 19 terminated with a connector according to the embodiment of the invention is manufactured (see FIG. 6) by connecting the buffered optical fiber 50, which has the glass fiber exposure portion 51A and the coating end surface 56A manufactured by processing the terminal of the buffered optical fiber 50, to the connector 18, which incorporates the ferrule 17 having the hollow space 17A enabled to accommodate the glass fiber exposure portion 51A. More specifically, the coating end surface 56A is made to abut against the abutting end surface 17B of the ferrule so as to accommodate the glass fiber exposure portion 51A in a state, in which no distortion force is applied to the glass fiber exposure portion 51A, in the hollow space 17A. Usually, the buffered optical fiber 50 and the connector 18 are connected to each other by a fastening means (not shown) to maintain this state. Thus, the buffered optical fiber 19 terminated with the connector has no transmission loss due to distortion.

Subsequently, the end surface 51B of the glass fiber and the open end surface 17C of the ferrule are processed into desired shapes, for instance by being grounded. Incidentally, a flat surface, a spherical surface, and a curved surface can be applied as the surfaces constituted by the end surface 51B of the glass fiber and the open end surface 17C of the ferrule, and are appropriately selected according to the specifications of the buffered optical fiber 19 terminated with the connector.

In the case of the buffered optical fiber 19 terminated with the connector, there is no residue of the ultraviolet curable resin layer 12 in the glass fiber exposure portion 11A. Thus, the glass fiber exposure portion 51A is accommodated in the hollow space 17A. The coating end surface 56A is caused to abut against the abutting end surface 17B of the ferrule. Moreover, the center of the end surface 51B of the glass fiber is present at a desired place. Therefore, in the case of the buffered optical fiber 19 terminated with the connector, there is no connection loss due to the shift of the position of the glass fiber. Consequently, the buffered optical fiber 19 terminated with the connector excels in optical transmission characteristics.

Further, the buffered optical fiber 50 according to the embodiment of the invention constitutes the buffered optical fiber 19 terminated with the connector. Thus, the buffered optical fiber 19 terminated with the connector is fire-resistant. Even when burning, toxic gas is not generated.

EXAMPLES

Hereinafter, the invention is described in detail by citing examples and comparative examples. However, the invention is not limited to these examples.

Examples 1 to 3

(The Manufacture of the Second Resin Composition)

Metal oxides and nitrogen-based flame retardant materials are added to 100 weight parts of the second polymer according to the compositions described in TABLE 1. The second resin compositions used in Examples 1, 2-1 to 2-3, and 3-1 to 3-2 are prepared. The second resin compositions are obtained by performing a method of using a biaxial mixer (the screw outside diameter: 45 mmφ, L/D=32) and producing a pellet by cutting an extrusion strand.

(Manufacture of Buffered Optical Fiber)

We used an optical fiber having the ultraviolet curable resin layer (the urethane acrylate resin layer) provided on the outer periphery of the glass fiber (the outside diameter is 125 μm) containing silica glass as a main component. The ultraviolet curable resin layer has a three-layer structure including the first ultraviolet curable resin layer, the second ultraviolet curable resin layer, and the colored layer. The outside diameter of a concentric part including up to the first ultraviolet curable resin layer is 200 μm. The outside diameter of a concentric part including up to the second ultraviolet curable resin layer is 245 μm. The outside diameter of the concentric part including up to the colored layer is 255 μm. The Young's modulus of the first ultraviolet curable resin layer is 1 MPa (at 25° C.). The Young's modulus of the second ultraviolet curable resin layer is 400 MPa (at 25° C.). The Young's modulus of the colored layer is 1100 MPa (at 25° C.). The buffered optical fibers according to Examples 1, 2-1 to 2-3, and 3-1 to 3-3 are manufactured by providing the second resin layer on the outer periphery of this optical fiber according to the aforementioned method (the outside diameter $D_s$: 0.9 mm). A single axis extruder (the outside diameter of a screw: 40 nmφ, L/D=25) is used as the extruder for coating the optical fiber with the second coating layer. The extruder is connected to the crosshead (corresponding to the crosshead 33C).

Example 4

(Manufacture of Second Resin Composition)

The second resin compositions used in Examples 4-1 and 4-2 are prepared by adding metal hydroxide and the nitrogen-based flame retardant material to 100 weight parts of the second polymer according to the compositions described in TABLE 2 and by performing a method similar to the method used for the Examples 1 to 3.

(Manufacture of Buffered Optical Fiber)

We used an optical fiber having the ultraviolet curable resin layer (the urethane acrylate resin layer) provided on the outer periphery of the glass fiber (the outside diameter is 125 μm) containing silica glass as a main component according to a method similar to the method used for the Examples 1 to 3. The ultraviolet curable resin layer has the three-layer structure including the first ultraviolet curable resin layer, the second ultraviolet curable resin layer, and the colored layer. The outside diameter of a concentric part including up to the first ultraviolet curable resin layer is 200 μm. The outside diameter of the concentric part including up to the second ultraviolet curable resin layer is 245 μm. The outside diameter of the concentric part including up to the colored layer is 255 μm. The Young's modulus of the first ultraviolet curable resin layer is 1 MPa (at 25° C.). The Young's modulus of the second ultraviolet curable resin layer is 400 MPa (at 25° C.). The Young's modulus of the colored layer is 1100 MPa (at 25° C.). Subsequently, the inner layer and the outer layer, which have the compositions described in TABLE 2, are provided on the outer periphery of this optical fiber by using a biaxial extruder (the outside diameter of a screw: 40 nmφ, L/D=25), as shown in FIG. 4. Thus, the buffered optical fibers according to the Examples 4-1 and 4-2 are manufactured (the outside diameter $D_s$: 0.9 mm).

Comparative Examples 1 and 2

Buffered optical fibers according to the Comparative Examples 1 and 2 are produced according to a method similar to the method used for the Examples 1 to 3. The composition of the second resin composition and the characteristic values of the buffered optical fibers are described in TABLE 1.

TABLE 1

High Flame Retardancy 0.9 mmφ Buffered Optical Fiber

| Second Resin Composition | | Example 1 | Example 2-1 | Example 2-2 | Example 2-3 | Example 3-1 | Example 3-2 | Comparative Example 1 | Comparative Example 2 |
|---|---|---|---|---|---|---|---|---|---|
| Base Polymer (Weight Parts) | ①PPE (poly-Phenylene ether polymer) | | | | | | | | |
| | ②PS (poly-styrene)-based Elastomer I | 35 | 40 | 40 | 40 | 35 | 35 | 35 | 35 |
| | ③PS-based Elastomer II | 65 | 60 | 60 | 60 | | 30 | 65 | 65 |
| | ④PS-based Elastomer III | | | | | 65 | 35 | | |
| | ⑤PS-based Elastomer IV | | | | | | | | |
| | ⑥PS-based Elastomer V | | | | | | | | |
| | ⑦PS-based Elastomer VI | | | | | | | | |
| Crosslinking Material | | | | | | | | | |
| Addition of Metal Hydroxide | | 200 | 200 | 250 | 150 | 180 | 150 | 200 | 200 |
| Silicon-based Lubricant | | 2 | 2 | 2 | 2 | 2 | 2 | 2 | 2 |
| N-(Nitrogen)based Flame Retardant Material | | 10 | 25 | 25 | 25 | 100 | 25 | 5 | 120 |
| Buffered optical fiber Physical Property | | | | | | | | | |
| Linear Expansion Coefficient (× $10^{-4}$) [1/K] | | 1.3 | 1.4 | 1.4 | 1.5 | 1.3 | 1.3 | 1.3 | 1.2 |
| Young's Modulus [MPa] | | 275 | 250 | 270 | 235 | 280 | 270 | 270 | 290 |
| Optical fiber Characteristics | | | | | | | | | |
| Residual thermal Distortion (120° C. × 168 hr) [μm/m] | | 120 | 115 | 100 | 140 | 105 | 110 | 135 | 90 |
| Optical Transmission Loss Characteristics (Room Temperature) [dB/km] | | 0.197 | 0.197 | 0.204 | 0.205 | 0.198 | 0.194 | 0.205 | 0.202 |
| Temperature Change Resistance Property Δα (−40-85° C.) [dB/km] | | 0.05 | 0.06 | 0.04 | 0.08 | 0.05 | 0.05 | 0.06 | 0.04 |

TABLE 1-continued

High Flame Retardancy 0.9 mmφ Buffered Optical Fiber

| Second Resin Composition | Example 1 | Example 2-1 | Example 2-2 | Example 2-3 | Example 3-1 | Example 3-2 | Comparative Example 1 | Comparative Example 2 |
|---|---|---|---|---|---|---|---|---|
| Amount of Protrusion (μm/m) | 80 | 80 | 65 | 90 | | | 100 | 60 |
| Appearance | ○ | ○ | ○ | ○ | ○ | ○ | ○ | X |
| Flame Retardancy (UL1581 Burning Test) | ○ | ○ | ○ | ○ | ○ | ○ | X | ○ |

Note:
PS-based Elastomer I: a kind of SEBS (S/EB = 3.5/6.5),
PS-based Elastomer II: a kind of SEBS (S/EB/MAH = 3.5/6/0.5),
PS-based Elastomer III: a kind of SEBS (S/EB = 1.0/9.0),
PS-based Elastomer IV: a kind of SEBS (S/EB/MAH = 1.0/8.0/0.5),
PS-based Elastomer V: a kind of SEBS (S/EB = 9.0/1.0),
PS-based Elastomer VI: a kind of SEBS (S/EB/MAH = 8.0/1.5/0.5),
MAH: styrene maleic anhydride copolymer

TABLE 2

High Flame Retardancy 0.9 mmφ Buffered Optical Fiber

| | Example 4-1 | | Example 4-2 | |
|---|---|---|---|---|
| Second Resin Composition | Inner Layer | Outer Layer | Inner Layer | Outer Layer |
| Base Polymer (Weight Parts) | | | | |
| ①PPE (polyphenylene ether polymer) | 20 | 80 | 25 | 85 |
| ②PS(poly-styrene)-based Elastomer I | | | | |
| ③PS-based Elastomer II | | | | |
| ④PS-based Elastomer III | 79 | | | |
| ⑤PS-based Elastomer IV | | | 74 | |
| ⑥PS-based Elastomer V | | 20 | | |
| ⑦PS-based Elastomer VI | | | | 15 |
| Crosslinking Material | 1 | | 1 | |
| Addition of Metal Hydroxide | 240 | 240 | 250 | 150 |
| Silicon-based Lubricant | 2 | | 2 | |
| N-based Flame Retardant Material | 30 | 30 | 20 | 30 |
| Buffered optical fiber Physical Property | | | | |
| Linear Expansion Coefficient ($\times 10^{-4}$) [1/K] | 1.8 | 1.1 | 1.7 | 1.2 |
| Young's Modulus [MPa] | 120 | 850 | 150 | 700 |
| Optical fiber Characteristics | | | | |
| Residual thermal Distortion (120° C. × 168 hr) [μm/m] | 150 | 150 | 145 | 145 |
| Optical Transmission Loss Characteristics (Room Temperature) [dB/km] | 0.195 | | 0.186 | |
| Temperature Change Resistance Property Δα (−40-85° C.) [dB/km] | 0.06 | | 0.06 | |
| Amount of Protrusion (μm/m) | — | — | — | — |
| Appearance | ○ | ○ | ○ | ○ |
| Flame Retardancy (UL1581 Burning Test) | ○ | ○ | ○ | ○ |
| $L_{UV}/L_{SH}$ (%) | 80 | | 85 | |

A method for measuring the linear expansion coefficient of the second resin composition, and a method for measuring the Young's modulus are as follows.

(Linear Expansion Coefficient)

The state of a test piece (a sheet formed by curing the second resin composition) is adjusted according to JIS K 7100. Then, the test piece is scanned in a temperature range of (−60)° C. to 100° C. by using a TMA (Thermo-Mechanical-Analyzer) described in JIS K 7197. Thus, the (mean) linear expansion coefficient is measured according to the prescriptions of JIS K 7197.

(Young's Modulus)

The second resin composition corresponding to each of the Examples and Comparative Examples is molten and kneaded by a publicly known apparatus constituted by a biaxial kneader/extruder, a pressure kneader, a Banbury mixer, a roll, and the like. Thus, a film object having a thickness of about 300 μm is formed. Subsequently, a test piece of No. 2 type (according to JIS K 7113) shaped like a dumbbell is manufactured from this film object. The Young's modulus is defined as that which is measured by using this test piece and performing a tension test under the conditions that the distance between benchmarks is 25 mm and the pulling rate is 1 mm/minute.

The evaluation of the buffered optical fiber is performed as follows.

[Residual Thermal Distortion]

A heat treatment is performed on the buffered optical fiber, which is adapted so that end surfaces of the glass fiber, the first coating layer, and the second coating layer are disposed on the same surface, under the conditions that the buffered optical fiber is heated at 120° C. for 168 hours. Upon completion of the heat treatment, the "distance between the end surface of the glass fiber and that of the second coating layer" is measured as the residual thermal distortion at cabling.

[Optical Transmission Loss Characteristic]

The amount (dB) of transmission loss of the buffered optical fiber is measured (at 23° C.) by using an OTDR measuring device (the wavelength: 1.55 μm). The transmission loss per unit length is indicated as an "initial loss" (dB/km). The lower the value of the initial loss becomes, the more the buffered optical fiber excels in the optical transmission characteristics.

[Temperature Change Resistance Property (Property of Maintaining Optical Transmission Characteristics Regardless of Temperature Change)]

Heat cycle exposure tests are repeatedly performed (the number of times: 5) on the buffered optical fiber by repeating a heat cycle consisting of 0.5 hours, in which the temperature is held at (−40)° C., and 0.5 hours, in which the temperature is held at 85° C. During the heat cycle exposure tests, an amount (dB) of transmission loss is measured by continuous monitoring (at the wavelength: 1.55 μm). The difference in quantity between the maximum loss variation and the minimum loss variation in a transmission loss amount is indicated as the amount of transmission loss variation (dB/km). The lower the value of the amount of transmission loss variation becomes, the more the buffered optical fiber excels in the temperature change resistance property.

[Amount of Protrusion (Pistoning Property)]

The heat cycle exposure test described in the description of the temperature change resistance property is performed on the buffered optical fiber 200 times. Thus, the amount of protrusion of the glass fiber (the distance between an end surface of the glass fiber and an end surface of the second coating layer) is measured. Results thereof are described in TABLE 2. The lower the amount of protrusion becomes, the more the buffered optical fiber excels in the pistoning property.

[Appearance of Buffered Optical Fiber]

The appearance of the buffered optical fiber is checked by visually observing the buffered optical fiber and by touching the buffered optical fiber with the hands. If the buffered optical fiber meets the conditions that neither "roughness of the surface shape" nor "convex foreign substances each having a size of about 10 μm to 100 μm" are present, it is judged that the appearance of the buffered optical fiber is good (○). Conversely, if the buffered optical fiber does not meet such conditions, it is judged that the appearance of the buffered optical fiber is bad (x).

[Flame Retardancy]

A test on the flame retardancy of the buffered optical fiber is performed according to the standard UL1581 VW-1.

Figure 8:
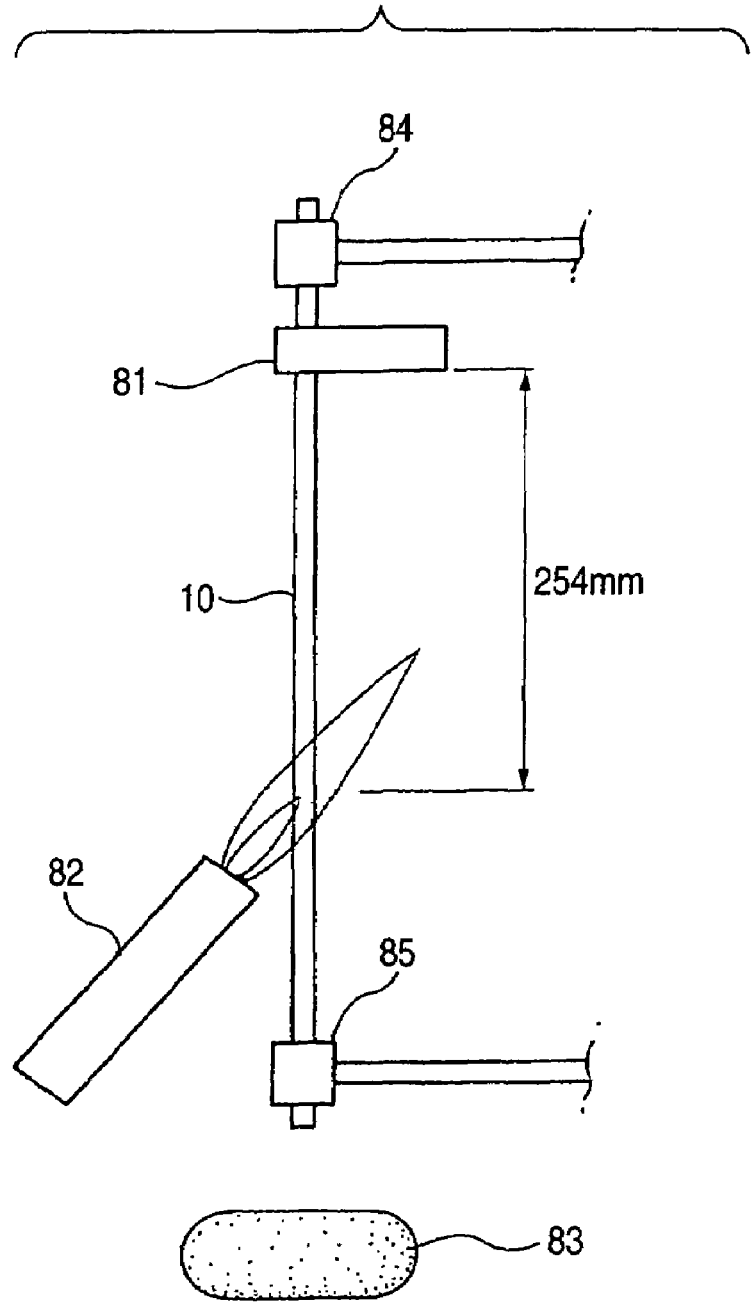
FIG. 8 is a view illustrating a method for a flame retardancy test on a buffered optical fiber of an example.

That is, as shown in FIG. 8, first, the top portion of the buffered optical fiber 10 (or 50) having a predetermined length is gripped by a gripping portion 84, while the bottom portion of the buffered optical fiber 10 is gripped by another gripping portion 85. Thus, the optical fiber 10 is set so that its longitudinal direction is the vertical direction. Absorbent cotton 83 is placed under the bottom portion of the buffered optical fiber 10. Kraft paper 81 is pasted to a place that is slightly lower than the gripping portion 84 for the buffered optical fiber 10. Subsequently, burner flames are spewed by a burner 82 to the position, which is lower than the Kraft paper 81 by 254 mm (during 5 cycles each consisting of a ignition time of 15 seconds and a quenching time of 15 seconds). Incidentally, the burner flames are such that the length of an inner flame is 40 mm, and that the length of an outer flame is 125 mm. If the buffered optical fiber satisfies the conditions that "no spreading fire reaches the Kraft paper 81", and that "the drooping of the coating, which would cause the absorbent cotton 83 to burn, does not occur, this buffered optical fiber is determined to be acceptable. If the buffered optical fiber does not satisfy such conditions, this buffered optical fiber is determined to be unacceptable.

[$L_{uv}/L_{SH}$ (%)]

The resin layers are removed from a part of the buffered optical fiber, which has a length of 30 mm from a terminal of the buffered optical fiber, by using a "coating remover JR-22" ("JR-22" is the trade name of the coating remover manufactured by Sumitomo Electric Industries, Ltd.) corresponding to the coating removing tool shown in FIG. 7. Incidentally, the case in which no ultraviolet curable resin layer is present in the separated resin layer is defined as "$L_{uv}/L_{SH}$=0%". The case in which the length in the drawing-out direction of the ultraviolet curable resin layer is equal to that in the drawing-out direction of the resin coating layer is defined as "$L_{uv}/L_{SH}$=100%". Incidentally, the drawing-out force (kgf) is measured by setting a drawing-out rate at 500 mm/minute. The drawing-out force of the buffered optical fiber of each of the Examples 4-1 and 4-2 is equal to or less than 2.5 kgf.

The buffered optical fibers according to the examples excel in appearance and flame retardancy. On the other hand, the buffered optical fiber according to the comparative example 1 is inferior in flame retardancy, because the amount of the contained nitrogen-based flame retardant material is too small. Further, the buffered optical fiber according to the comparative example 2 is inferior in appearance, because the amount of the nitrogen-based flame retardant material is too large.

Incidentally, the second resin composition constituting each of the second coating layers of the buffered optical fibers according to the examples and the comparative examples does not contain halogenated materials and phosphorus. Thus, the buffered optical fibers do not pollute the environment system. That is, when the second polymer burns, the generation of toxic gas is reduced. Further, it restrains rivers and lakes from being polluted owing to a hypertrophic condition brought by phosphate compounds which flow into the rivers and the lakes.

INDUSTRIAL APPLICABILITY

As described above, the invention can provide a buffered optical fiber enabled not to pollute the environment system having high flame retardancy, and enabled to reduce degradation of optical transmission characteristics even when a connector is connected to the buffered optical fiber, and can also provide a connecter-terminated buffered optical fiber that excels in environmental characteristics, mechanical characteristics, and optical transmission characteristics.

The invention claimed is:

1. A buffered optical fiber having a second coating layer on an outer peripheral surface of an optical fiber produced by providing a first coating layer on an outer peripheral surface of a glass fiber,
    wherein a second resin composition constituting the second coating layer comprises a base polymer, and 100 to 250 weight parts of metal hydroxide and 10 to 100 weight parts of a nitrogen-based flame retardant material per 100 weight parts of the base polymer,
    wherein the second resin composition does not contain halogenated materials and
    wherein the second resin composition comprises, as the base polymer, one of components selected from the group consisting of a mixture of polystyrene-based polymer and polyphenylene ether polymer, and a mixture of polystyrene-based elastomer and polyphenylene ether polymer.

2. The buffered optical fiber according to claim 1, wherein a part of the polystyrene-based polymer or the polystyrene-based elastomer is subjected to acid modification.

3. The buffered optical fiber according to claim 1, wherein the second coating layer is formed of two or more coating sublayers.

4. The buffered optical fiber according to claim 1, wherein the buffered optical fiber is constituted so that an amount of transmission loss variation (dB/km) is equal to or less than 0.2 dB/km, said
    amount of transmission loss variation comprising: a difference in quantity between a maximum loss variation and a minimum loss variation in a transmission loss amount (in dB/km at a wavelength of 1.55 μm and including a transmission loss amount generated just after the test is started) generated during a heat cycle exposure test performed by repeating a heat cycle consisting of 0.5 hours, in which temperature is held at (−40)° C., and 0.5 hours, in which temperature is held at 85° C.

5. The buffered optical fiber according to claim 1, wherein the linear expansion coefficient of the second resin composition is equal to or less than $4.0 \times 10^{-4}$ (1/K).

6. The buffered optical fiber according to claim 1, wherein residual thermal distortion at cabling is equal to or less than 150 μm, said residual thermal distortion at cabling comprising: a distance between an end surface of said glass fiber and an end surface of said second coating layer in said buffered optical fiber which is heat-treated at 120° C. for 168 hours.

7. The buffered optical fiber according to claim 3, wherein said buffered optical fiber has said first coating layer of an ultraviolet curable resin layer and said buffered optical fiber is configured so that when a cut is made in the direction from said second coating layer to said glass fiber so as not to allow an apex of the cut to reach said glass fiber and the ultraviolet curable resin layer and said second coating layer are separated from said glass fiber by drawing them out of the glass fiber, a ratio of a length of said ultraviolet curable resin layer in a separated and removed coat piece to a length of said separated second coating layer is 15% to 85%.

8. The buffered optical fiber according to claim 7, wherein an inner layer and an outer layer are serially provided as the sublayers of said second coating layer on an outer peripheral surface of said optical fiber in a direction in which said layers are away from said optical fiber, said inner layer being derived by adding 100 to 250 weight parts of metal hydroxide and less than 100 weight parts of a nitrogen-based flame retardant material per 100 weight parts of polystyrene-based thermoplastic polymer, polyolefin-based thermoplastic polymer, or polyphenylene ether polymer, or a mixed polymer of these materials.

9. The buffered optical fiber according to claim 7, wherein an inner layer and an outer layer are serially provided as said second coating layer on an outer peripheral surface of said optical fiber in a direction in which said layers are away from the optical fiber, wherein said outer layer being derived by adding 100 to 250 weight parts of metal hydroxide and less than 100 weight parts of a nitrogen-based flame retardant material per 100 weight parts of polystyrene-based thermoplastic polymer, polyolefin-based thermoplastic polymer, or polyphenylene ether polymer, or a mixed polymer of these materials.

10. The buffered optical fiber according to claim 7, which is constituted so that a drawing-out force on drawing out said ultraviolet curable resin layer and said second coating layer from said glass fiber is equal to or less than 2.5 kgf.

11. The buffered optical fiber according to claim 1, wherein the second resin composition does not contain phosphorous.

* * * * *